US012758883B2

(12) United States Patent
Li

(10) Patent No.: US 12,758,883 B2
(45) Date of Patent: Oct. 13, 2026

(54) TRAINING METHOD OF MODEL, GAME CONFRONTATION PLAYER MATCHING METHOD, MEDIUM AND DEVICE

(71) Applicant: Beijing Zitiao Network Technology Co., Ltd., Beijing (CN)

(72) Inventor: Hanye Li, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 343 days.

(21) Appl. No.: 18/533,160

(22) Filed: Dec. 7, 2023

(65) Prior Publication Data

US 2024/0198237 A1 Jun. 20, 2024

(30) Foreign Application Priority Data

Dec. 15, 2022 (CN) ........................ 202211616665.6

(51) Int. Cl.
*A63F 13/798* (2014.01)
*A63F 13/795* (2014.01)

(52) U.S. Cl.
CPC .......... *A63F 13/798* (2014.09); *A63F 13/795* (2014.09)

(58) Field of Classification Search
CPC ........ A63F 13/847; A63F 13/67; A63F 13/35; A63F 13/795; A63F 13/798
USPC .......................................................... 463/42
See application file for complete search history.

(56) References Cited

U.S. PATENT DOCUMENTS

| | | | | |
|---|---|---|---|---|
| 9,868,065 B2 * | 1/2018 | Ishida | ................ | G06Q 30/0209 |
| 10,318,670 B2 * | 6/2019 | Marti | ...................... | G06F 30/20 |
| 12,343,638 B2 * | 7/2025 | Pichaimurthy | ......... | A63F 13/77 |
| 2020/0178026 A1 * | 6/2020 | Liang | ..................... | G06N 20/00 |
| 2021/0182799 A1 * | 6/2021 | Kishore | ................... | G06N 5/02 |

FOREIGN PATENT DOCUMENTS

| | | |
|---|---|---|
| CN | 109453524 A | 3/2019 |
| CN | 109603159 A | 4/2019 |
| CN | 114588634 A | 6/2022 |
| CN | 115105836 A | 9/2022 |
| WO | WO 2009/032598 A1 | 3/2009 |

OTHER PUBLICATIONS

China Patent Application No. 202211616665.6; First Office Action; dated Jul. 30, 2025; 17 pages.

* cited by examiner

*Primary Examiner* — Michael A Cuff
(74) *Attorney, Agent, or Firm* — BakerHostetler

(57) ABSTRACT

The present disclosure relates to a training method of a model, a game confrontation player matching method, a medium, and a device. The training method of the advantage prediction model includes: acquiring an advantage value of each confrontation among a plurality of confrontations within a preset historical period and historical confrontation positive performance sample data of both game players before each confrontation; and training a first preset initial model by taking the advantage value of each confrontation among the plurality of confrontations and the historical confrontation positive performance sample data of both game players before each confrontation as first training data, so as to obtain the advantage prediction model.

20 Claims, 5 Drawing Sheets

TRAINING METHOD OF MODEL, GAME CONFRONTATION PLAYER MATCHING METHOD, MEDIUM AND DEVICE

CROSS-REFERENCE TO RELATED APPLICATION

The present application claims the priority of Chinese patent application No. 202211616665.6, filed on Dec. 15, 2022, the entire disclosure of which is incorporated herein by reference as part of the disclosure of this application.

TECHNICAL FIELD

The present disclosure relates to a field of game technology, and more particularly, to a training method of a model, a game confrontation player matching method, a medium, and a device.

BACKGROUND

In competitive games (e.g., multiplayer online battle arena (MOBA), sport competitive games, etc.), opponent matching is mostly based on game results of users in historical game confrontations, for example, opponent matching may be performed according to win/loss rates and kill death assist (KDA) in historical game confrontations, so as to ensure balance of win rates and balance of KDA performance between both game players.

SUMMARY

The summary is provided to briefly introduce the concepts, which will be described in detail in the detailed embodiments described below. The summary is not intended to identify key features or necessary features of the protected technical solution, nor is it intended to limit the scope of the protected technical solution.

The present disclosure provides a training method of a model, a game confrontation player matching method, a medium, and a device.

In the first aspect, the present disclosure provides a training method of an advantage prediction model, and the method comprises:

- acquiring an advantage value of each confrontation among a plurality of confrontations within a preset historical period and historical confrontation positive performance sample data of both game players before each confrontation; and
- training a first preset initial model by taking the advantage value of each confrontation among the plurality of confrontations and the historical confrontation positive performance sample data of both game players before each confrontation as first training data, so as to obtain the advantage prediction model.

In the second aspect, the present disclosure provides a game confrontation player matching method, which is applied to a controller, the controller comprises the advantage prediction model according to the first aspect described above, and the method comprises:

- in response to a game opponent matching request from a target player, determining a predicted advantage value of the target player over each player to be matched through the advantage prediction model, wherein the predicted advantage value is used to represent an advantage that the target player has when the player to be matched plays against the target player; and
- matching the target player with an opponent player from a plurality of players to be matched according to the predicted advantage value.

In the third aspect, the present disclosure provides a training apparatus of an advantage prediction model, and the apparatus comprises:

- an acquiring module, configured to acquire an advantage value of each confrontation among a plurality of confrontations within a preset historical period and historical confrontation positive performance sample data of both game players before each confrontation; and
- a training module, configured to train a first preset initial model by taking the advantage value of each confrontation among the plurality of confrontations and the historical confrontation positive performance sample data of both game players before each confrontation as first training data, so as to obtain the advantage prediction model.

In the fourth aspect, the present disclosure provides a game confrontation player matching apparatus, which is applied to a controller, and the controller comprises the advantage prediction model according to the first aspect described above. The apparatus comprises:

- a first determining module, configured to, in response to a game opponent matching request from a target player, determine a predicted advantage value of the target player over each player to be matched through the advantage prediction model, wherein the predicted advantage value is used to represent an advantage that the target player has when the player to be matched plays against the target player; and
- a second determining module, configured to match the target player with an opponent player from a plurality of players to be matched according to the predicted advantage value.

In the fifth aspect, the present disclosure provides a computer readable medium, and a computer program is stored on the computer readable medium, the computer program, when executed by a processing apparatus, implements steps of the method according to the first aspect or the second aspect.

In the sixth aspect, the present disclosure provides an electronic device, which comprises:

- a storage apparatus, storing a computer program; and
- a processing apparatus, configured to execute the computer program in the storage apparatus, so as to implement steps of the method according to the first aspect or the second aspect.

In the above-described technical solution, an advantage value of each confrontation among the plurality of confrontations within the preset historical period, and historical confrontation positive performance sample data of both game players before each confrontation are acquired; the first preset initial model is trained by taking the advantage value of each confrontation among the plurality of confrontations and the historical confrontation positive performance sample data of both game players before each confrontation as the first training data, so as to obtain the advantage prediction model. The advantage prediction model is capable of measuring the advantage during the confrontation process through the advantage value, thus measuring the confrontation experience and the confrontation intense degree from a global dimension; and the target player is matched with the opponent player according to the advantage value, which may more effectively improve user experience and reduce probability of game user loss.

Other features and advantages of the present disclosure will be illustrated in detail in the subsequent detailed embodiments.

BRIEF DESCRIPTION OF THE DRAWINGS

By combining the accompanying drawings and referring to the following specific implementation methods, the above and other features, advantages, and aspects of respective embodiments disclosed herein will become more apparent.

Throughout the drawings, the same or similar reference signs indicate the same or similar elements. It should be understood that the accompanying drawings are illustrative, and the components and elements may not necessarily be drawn to scale.

In the accompanying drawings:

FIG. 1 is a flow chart of a training method of an advantage prediction model illustrated by an exemplary embodiment of the present disclosure;

FIG. 2 is a flow chart of the training method of the advantage prediction model according to the embodiment illustrated in FIG. 1;

FIG. 3 is a model test heat map illustrated by an exemplary embodiment of the present disclosure;

FIG. 4 is a schematic diagram of a win rate curve of a confrontation process illustrated by an exemplary embodiment of the present disclosure;

FIG. 5 is a flow chart of a game confrontation player matching method illustrated by an exemplary embodiment of the present disclosure;

FIG. 6 is a flow chart of the game confrontation player matching method according to the embodiment illustrated in FIG. 5 of the present disclosure;

FIG. 7 is a schematic flow chart of an application of a game confrontation player matching method illustrated by an exemplary embodiment of the present disclosure;

FIG. 8 is a block diagram of a training apparatus of an advantage prediction model illustrated by an exemplary embodiment of the present disclosure;

FIG. 9 is a block diagram of a game confrontation player matching apparatus illustrated by another exemplary embodiment of the present disclosure; and FIG. 10 is a block diagram of an electronic device illustrated by an exemplary embodiment of the present disclosure.

DETAILED DESCRIPTION

Figure 1:
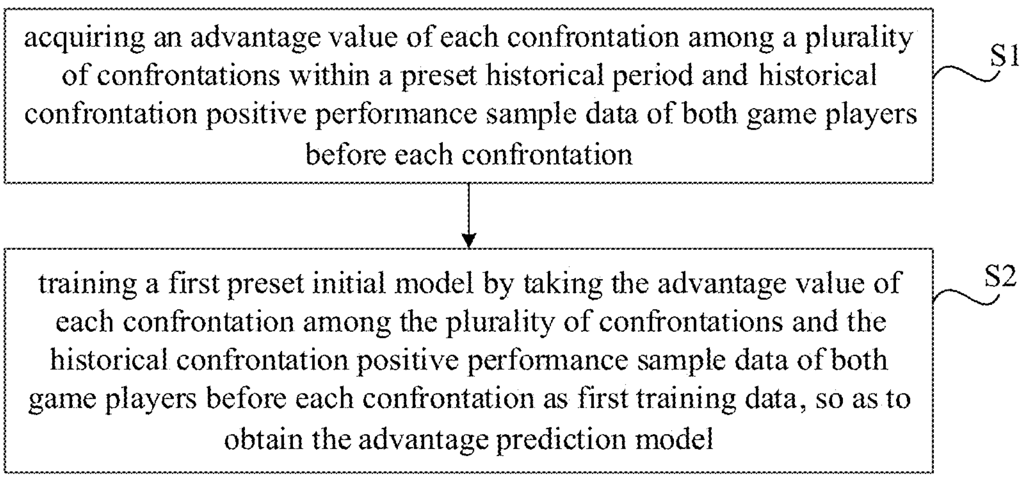

Detailed description of the embodiments of the present disclosure are described below with reference to the accompanying drawings. Although certain embodiments of the present disclosure are illustrated in the accompanying drawings, it should be understood that the present disclosure can be implemented in various forms and should not be construed as limited to the embodiments described herein. Instead, these embodiments are provided for a more thorough and complete understanding of the present disclosure. It should be understood that the accompanying drawings and embodiments disclosed herein are for illustrative purposes only and are not intended to limit the protection scope of the present disclosure.

It should be understood that the various steps recorded in the method implementations of the present disclosure can be executed in different orders and/or in parallel. In addition, the method implementations may include additional steps and/or omit the steps illustrated for execution. The scope of the present disclosure is not limited in this regard.

The term "including" (or "comprising", etc.) and variants thereof used herein are open including, that is, "including but not limited to". The term "based on" is "at least partially based on". The term "one embodiment" represents "at least one embodiment"; the term "another embodiment" represents "at least one other embodiment"; and the term "some embodiments" represents "at least some embodiments". Relevant definitions of other terms will be given in description below.

It should be noted that concepts such as "first", "second", etc. as mentioned in the present disclosure are only used to distinguish different apparatuses, modules or units, but not to define orders or interdependence of functions executed by these apparatuses, modules or units.

It should be noted that modification of "one" and "a plurality of" as mentioned in the present disclosure is exemplary rather than restrictive, and those skilled in the art should understand that unless otherwise explicitly designated in the context, it should be understood as "one or more".

Names of messages or information interacted between a plurality of apparatuses according to the implementations of the present disclosure are only used for illustrative purposes, and are not used to limit the scope of these messages or information.

It should be understood that before using the technical solutions disclosed in the respective embodiments of the present disclosure, a user should be informed of type, usage scope, usage scenarios, etc. of personal information involved in the present disclosure and authorization from the user should be acquired according to relevant laws and regulations in an appropriate manner.

For example, in response to receiving an active request of a user, a prompt message is sent to the user to clearly remind the user that the operation to be executed as requested by the user will require obtaining and using personal information of the user. Thus, according to the prompt information, the user may autonomously choose whether to provide personal information to software or hardware such as an electronic device, an application, a server, or a storage medium that executes the operation of the technical solution of the present disclosure.

As an optional but non-restrictive implementation, in response to receiving an active request of a user, a prompt message may be sent to the user through a pop-up window, where a prompt message may be presented in text. In addition, the pop-up window may also carry a selection control for the user to choose whether to "agree" or "disagree" to provide personal information to an electronic device.

It should be understood that the above-described processes of informing and acquiring user authorization are only illustrative and do not constitute a limitation on the implementation of the present disclosure; other modes that meet relevant laws and regulations may also be applied to the implementation of the present disclosure.

Meanwhile, it may be understood that the data involved in the technical solution (including but not limited to the data per se, acquisition or use of data) should comply with requirements of corresponding laws, regulations and relevant stipulations.

Before introducing the specific implementations of the present disclosure in detail, application scenarios of the present disclosure will be illustrated firstly. The present disclosure may be applied to an opponent matching process in sports competitive games, MOBA competitive games, etc. At present, in related technologies, opponent matching is usually based on game results of users in historical game confrontations; and the game results usually include a win/lose status, KDA performance, etc. However, the inventor of the present disclosure finds that information content of the win/lose status per se is insufficient, and KDA only measures game experience of a singleton, so relevant data of the game results is neither sufficient to measure experience in the user confrontation process on a global dimension, nor capable of representing a game intense degree of players. That is to say, opponent matching only through the win/loss rate and KDA cannot effectively improve game experience of both game players.

In order to solve the above-described technical problems, the present disclosure provides a training method of a model, a game confrontation player matching method, a medium and a device. In the training method of the advantage prediction model, an advantage value of each confrontation among a plurality of confrontations within a preset historical period and historical confrontation positive performance sample data of both game players before each confrontation are acquired; a first preset initial model is trained by taking the advantage value of each confrontation among the plurality of confrontations and the historical confrontation positive performance sample data of both game players before each confrontation as first training data, so as to obtain the advantage prediction model. The advantage prediction model is capable of measuring an advantage during the confrontation process through the advantage value, thus measuring the confrontation experience and the confrontation intense degree from a global dimension; and the target player is matched with the opponent player according to the advantage value, which may more effectively improve user experience and reduce probability of game user loss.

Hereinafter, the technical solutions of the present disclosure will be explained in detail in conjunction with specific embodiments.

FIG. 1 is a flow chart of a training method of an advantage prediction model illustrated by an exemplary embodiment of the present disclosure. As illustrated in FIG. 1, a training process of the advantage prediction model may include:

S1: acquiring an advantage value of each confrontation among a plurality of confrontations within a preset historical period and historical confrontation positive performance sample data of both game players before each confrontation.

The advantage value is used to measure an advantage generated during a game confrontation process; the larger the advantage value, the more obvious the advantage; and the advantage value being zero indicates advantage balance between both game players.

S2: training a first preset initial model by taking the advantage value of each confrontation among the plurality of confrontations and the historical confrontation positive performance sample data of both game players before each confrontation as first training data, so as to obtain the advantage prediction model.

In the first training data, the advantage value of each confrontation can be used for advantage value annotation on the historical confrontation positive performance sample data of both game players before the confrontation; and the first preset initial model may be a neural network model or other machine learning model.

By using the above-described technical solutions, an advantage prediction model for acquiring a player advantage during the game confrontation process can be trained; and the advantage value output by the advantage prediction model can measure the confrontation experience and the confrontation intense degree from a global dimension.

Figure 2:
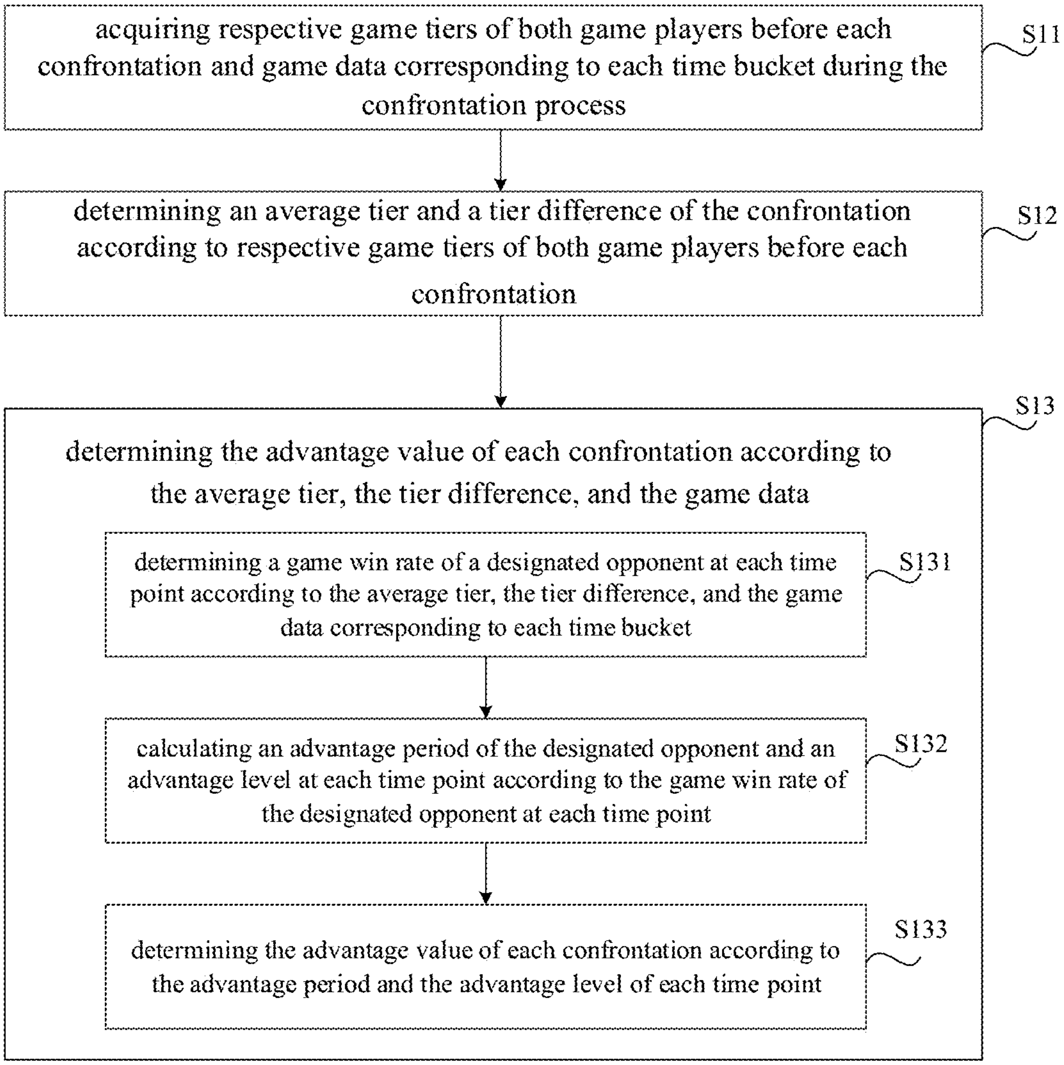

FIG. 2 is a flow chart of the training method of the advantage prediction model according to the embodiment illustrated in FIG. 1. As illustrated in FIG. 2, the step S1 of acquiring an advantage value of each confrontation among a plurality of confrontations within a preset historical period in FIG. 1 may be implemented through steps illustrated in S11 to S13 below:

S11: acquiring respective game tiers of both game players before each confrontation and game data corresponding to each time bucket during the confrontation process.

The game tier refers to a game rank of each player of both game players; and the game data includes a score difference of each game scoring dimension. For example, in a game that includes killing game characters or animals, as well as turret destroying tasks, the turret destroying tasks include an outer turret destroying task, a second-class-turret destroying task, and a highland turret destroying task, and the game data may include a kill count difference, a total turret destroy count difference, an outer turret destroy count difference, a second-class-turret destroy count difference, a highland turret destroy count difference, etc.

S12: determining an average tier and a tier difference of the confrontation according to respective game tiers of both game players before each confrontation.

The average tier is an average tier of both game players; and the tier difference is a difference between tier sums of both game players in the confrontation.

Exemplarily, if both game confrontation players in a confrontation include a red team and a blue team, the red team includes three team members, respectively, team member A, team member B, and team member C, the blue team includes three team members, respectively, team member a, team member b, and team member c. Team member A has a game tier of 2-level, team member B has a game tier of 4-level, team member C has a game tier of 3-level, team member a has a game tier of 3-level, team member b has a game tier of 4-level, and team member c has a game tier of 5-level, then an average tier of this confrontation is 3.5 level, and a tier difference between the red team and the blue team is $(2+4+3)-(3+4+5)=-3$.

S13: determining the advantage value of each confrontation according to the average tier, the tier difference, and the game data.

The step S13 may be implemented through steps illustrated in S131 to S133 below:

S131: determining a game win rate of a designated opponent at each time point according to the average tier, the tier difference, and the game data corresponding to each time bucket.

In this step, a target win rate prediction model may be determined from a target set according to the average tier and a target identifier of each time bucket; the target set includes a win rate prediction model for each time bucket under different average tiers; the average tier, the tier difference, and the score difference of each game scoring dimension are taken as inputs of the target prediction model, so as to acquire the game win rate output by the target prediction model.

A training method of a win rate prediction model of each time bucket under different average tiers is as follows.

Historical game sample data is acquired. The historical game sample data includes a tier difference sample feature of both game players under each time bucket in each confrontation among the plurality of confrontations and a score difference sample feature of each game scoring dimension. A win rate prediction model corresponding to each time bucket under each average tier is determined according to the tier difference sample feature of each time bucket under each average tier in the historical game sample data and the score difference sample feature.

Figure 3:
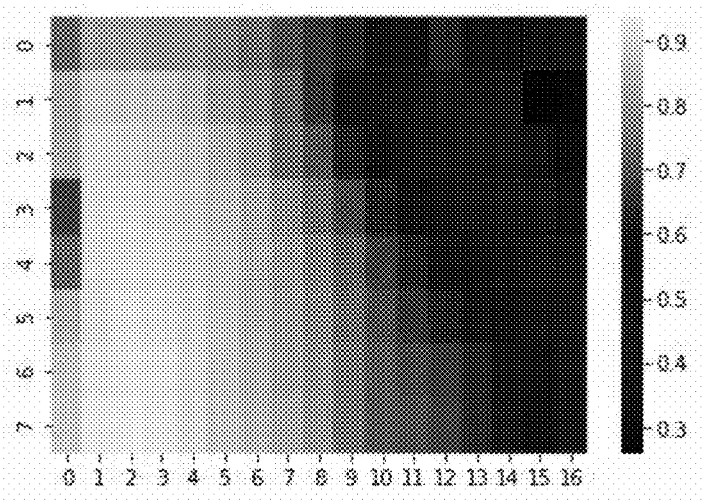

It should be noted that the each win rate prediction model may be a linear regression model. One game includes 17 minute buckets, 8 average tiers, and 6 game features (tier difference feature, and score difference features of 5 game scoring dimensions (which may respectively be a kill count difference, a total turret destroy count difference, an outer turret destroy count difference, a second-class-turret destroy count difference, and a highland turret destroy count difference)). If the win rate prediction model corresponding to each time bucket under each average tier is a vector including 7 parameters (coefficient of tier difference feature, coefficients of score difference features in 5 game scoring dimensions, and intercept), then 8×17 win rate prediction models may be obtained. As illustrated in FIG. 3, FIG. 3 is a model test heat map illustrated by an exemplary embodiment of the present disclosure. In FIG. 3, the horizontal axis represents minute buckets, respectively, [0 to 10] representing a 0th minute bucket, [10 to 11] representing a 1st minute bucket, [11 to 12] representing a 2nd minute bucket, [13 to 26] having each minute representing one minute bucket, [26 and above] representing a 16th minute bucket, and a vertical axis represents an average tier of both game players. Different grayscales represent accuracy of the models. The larger the grayscale, the lower the accuracy of the model represented thereby, while the smaller the grayscale, the higher the accuracy of the model represented thereby. Each grid corresponds to a test result of one win rate prediction model, and FIG. 3 includes test results for 8×17 win rate prediction models.

Exemplarily, Y(7, 9) is used to represent a win rate of the red team at the 18th minute (the 9th minute bucket) with an average tier of 7-level; the win rate prediction model Y(7, 9) may be represented by using a tier difference $X_1$ and the score differences of game scoring dimensions (e.g., including a kill count difference $X_2$, a total turret destroy count difference $X_3$, an outer turret destroy count difference $X_4$, a second-class-turret destroy count difference $X_5$, and a highland turret destroy count difference $X_6$), for example, may be expressed as:

$$Y(7,9)=0.012X_1+0.003X_2+0.003X_3-0.02X_4+0.051X_5+0.004X_6+0.516.$$

S132: calculating an advantage period of the designated opponent and an advantage level at each time point according to the game win rate of the designated opponent at each time point.

The designated opponent is either side of both opponents in the confrontation.

Figure 4:
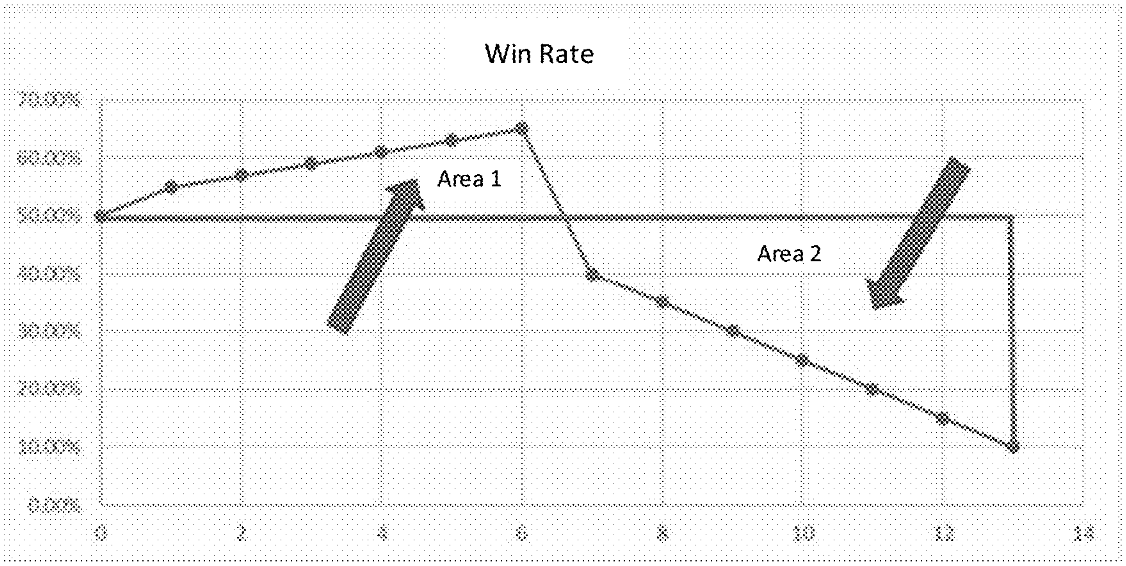

Exemplarily, FIG. 4 is a schematic diagram of a win rate curve of a confrontation process illustrated by an exemplary embodiment of the present disclosure. In FIG. 4, the vertical axis represents a win rate, the horizontal axis represents confrontation time, and the curve in FIG. 4 represents a win rate curve of the red team during the confrontation process between the red team and the blue team. The win rate curve is used to represent a win rate of the red team at each time point during the confrontation process, the advantage value of the red team in the confrontation process is a difference between area 1 and area 2 in FIG. 4. Area 1 represents a portion where the win rate is greater than 50% in the confrontation process, which belongs to a case where the red team has an advantage in the confrontation process; area 2 is a portion where the win rate is less than 50%, which belongs to a case where the advantage of the red team is less than the advantage of the blue team in the confrontation process. The difference between area 1 and area 2 is the advantage of the red team in the confrontation process. If the difference between area 1 and area 2 (i.e., the advantage value) is less than 0, then it represents that the advantage of the red team is less than the advantage of the blue team; if the difference between area 1 and area 2 (i.e., the advantage value) is greater than 0, then it represents that the advantage of the red team is greater than the advantage of the blue team; if the difference between area 1 and area 2 (i.e., the advantage value) is equal to 0, then it represents that the advantage of the red team is equal to the advantage of the blue team. Taking FIG. 4 as an example, if the designated opponent is the red team, then the advantage period of the designated opponent is from the 0th minute to the 13th minute, where the advantage during the 0th minute to the 6.5th minute is a positive value, and the advantage during the 6.5th minute to the 13th minute is a negative value. The advantage level of each time point is the difference between each point on the curve and 50%.

S133: determining the advantage value of each confrontation according to the advantage period and the advantage level of each time point.

Integration of the advantage level over the advantage period can be calculated, so as to obtain the advantage value.

Exemplarily, still taking FIG. 4 as an example, an integral value of the advantage level within the advantage period is calculated, the integral value is taken as the advantage value of the red team; and when expressed geometrically, a difference between area 1 and area 2 is the advantage value of the red team.

In the above technical solutions, the advantage during the confrontation process can be measured through the advantage value, so that the confrontation experience and the confrontation intense degree can be measured from a global dimension. The target player is matched with the opponent player according to the advantage value, which can more effectively improve user experience and reduce probability of game user loss.

Figure 5:
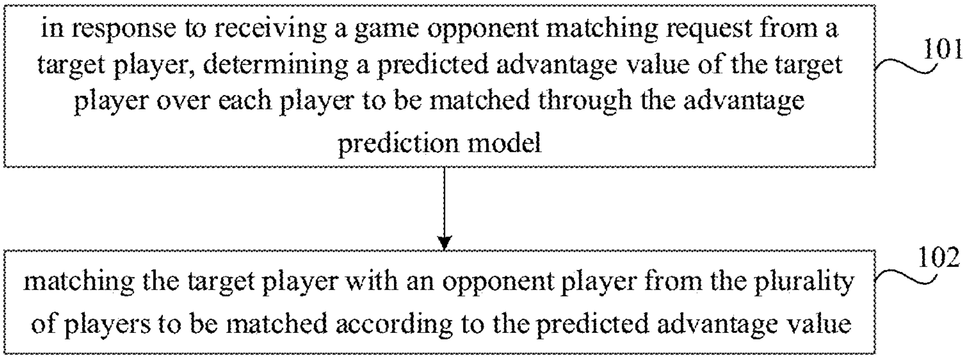

FIG. 5 is a flow chart of a game confrontation player matching method illustrated by an exemplary embodiment of the present disclosure. As illustrated in FIG. 5, the method can be applied to a controller, and the method may include:

Step 101: in response to receiving a game opponent matching request from a target player, determining a predicted advantage value of the target player over each player to be matched through the advantage prediction model.

The predicted advantage value is used to represent the advantage that the target player has when the player to be matched plays against the target player.

Figure 6:
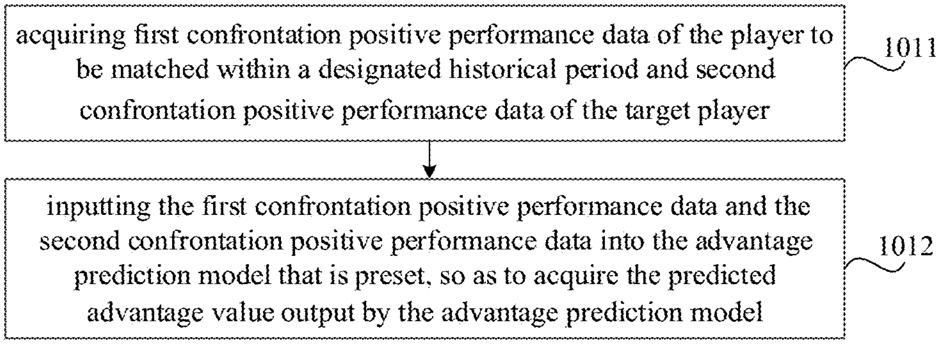

In this step, the advantage prediction model is the model trained by using the method illustrated in FIG. 1 or FIG. 2 above. The implementation of determining the predicted advantage value of the target player over each player to be matched through the advantage prediction model as described above may be illustrated in FIG. 6 (FIG. 6 is a flow chart of the game confrontation player matching method according to the embodiment illustrated in FIG. 5 of the present disclosure):

Step 1011: acquiring first confrontation positive performance data of the player to be matched within a designated historical period and second confrontation positive performance data of the target player.

The first confrontation positive performance data may include: data related to positive performance (performance that is favorable for winning the game) such as a win rate, KDA and a most valuable player (MVP, the player who contributes the most to win) rate of the player to be matched within the designated historical period before the current time. The second confrontation positive performance data may include data related to positive performance (performance that is favorable for winning the game) such as a win rate, KDA, and a MVP rate of the target player within the designated historical period before the current time.

Step 1012: inputting the first confrontation positive performance data and the second confrontation positive performance data into the advantage prediction model that is preset, so as to acquire the predicted advantage value output by the advantage prediction model.

Step 102: matching the target player with an opponent player from the plurality of players to be matched according to the predicted advantage value.

In this step, a target confrontation type corresponding to the target player may be determined, where the target confrontation type is used to represent different degrees of game experience needs; in the case where it is determined that the predicted advantage value belongs to the target confrontation type, the player to be matched is taken as the opponent player.

One possible implementation for determining the target confrontation type corresponding to the target player as described above may include: acquiring user attribute data of the target player, where the user attribute data includes a user identity feature and a user game attribute feature; inputting the user attribute data into the confrontation type prediction model that is preset, so as to acquire the target confrontation type output by the confrontation type prediction model.

The user identity feature may include identification information such as user ID, avatar, name, and so on. The user game attribute feature may include: attribute features related to in-game events such as game rank, recent win rate, game time length, etc. of the user.

A training mode of the confrontation type prediction model as described above may include:

acquiring user attribute sample data of a plurality of players, where the user attribute sample data includes confrontation type annotation data; and training a second preset initial model by taking the user attribute sample data as second training data, so as to obtain the confrontation type prediction model.

It should be noted that the user attribute sample data may include the user identity feature and the user game attribute feature; and the second preset initial model may be a neural network model or a regression model in the current technology.

In another possible implementation, the target player may preset the target confrontation type according to his/her own game preferences; different target confrontation types correspond to different advantage value intervals; a corresponding relationship between the target confrontation type and the advantage value interval may be preset; and in this way, after the target confrontation type preset by the target player is acquired, it may be automatically mapped to the advantage value interval corresponding to the target confrontation type.

It should be noted that the advantage value is used to represent the advantage in the confrontation process; the larger the advantage value, the more obvious the advantage is; the advantage value being zero indicates advantage balance between both game players; and the advantage value interval includes a plurality of different advantage values, which are used to represent a range of advantages.

In addition, the implementation of determining that the predicted advantage value belongs to the target confrontation type as described in step 102 above may include: determining the advantage value interval corresponding to the target confrontation type; and determining that the predicted advantage value belongs to the target confrontation type in the case where the predicted advantage value belongs to the advantage value interval.

Exemplarily, if the target confrontation type of the target player is a setback-overcoming type, and the corresponding advantage value interval is [−1.5, 0], then in the case where the predicted advantage value of the target player over this player to be matched belongs to the advantage value interval, it is determined that the predicted advantage value belongs to the target confrontation type, and this player to be matched is taken as the opponent player.

Figure 7:
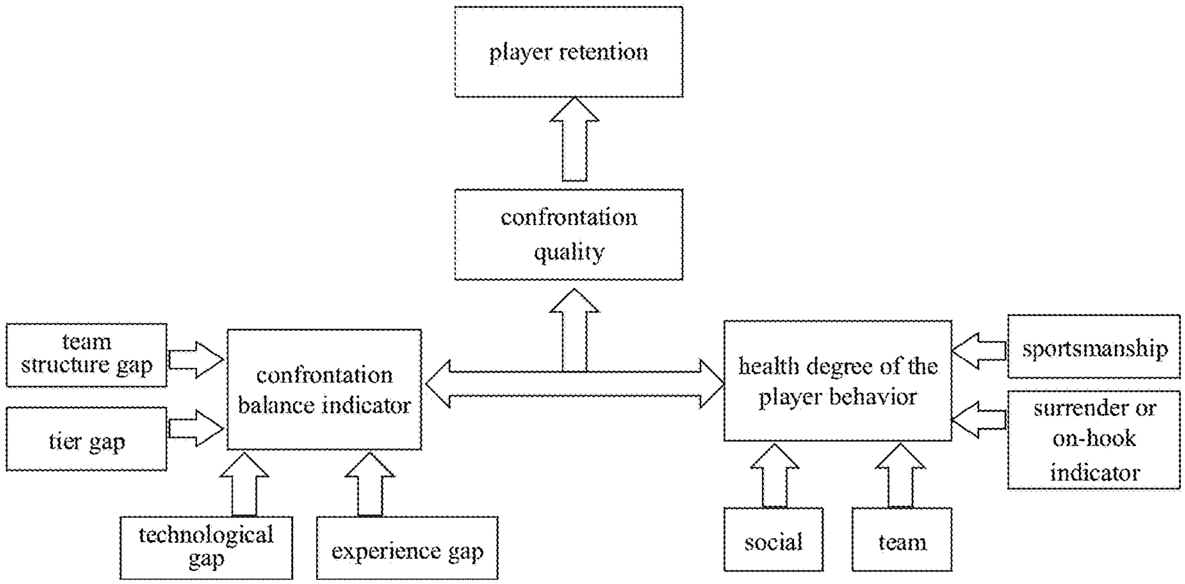

FIG. 7 is a schematic flow chart of an application of a game confrontation player matching method illustrated by an exemplary embodiment of the present disclosure. As illustrated in FIG. 7, confrontation balance is measured through the confrontation advantage value and the win rate, and confrontation quality is ensured through a health degree of the player behavior, which may effectively improve game experience of players and may further enhance a retention rate of players.

In the above technical solutions, the target confrontation type corresponding to the target player is determined in response to receiving the game opponent matching request from the target player, different target confrontation types are used to represent different degrees of gaming experience needs; the target player is matched with the opponent player from the plurality of players to be matched according to the target confrontation type, and the opponent player can be matched according to the advantage degree preferred by the target player, which, thus, may match both game players from a global advantage dimension, and effectively improve game experience of both game players.

Figure 8:
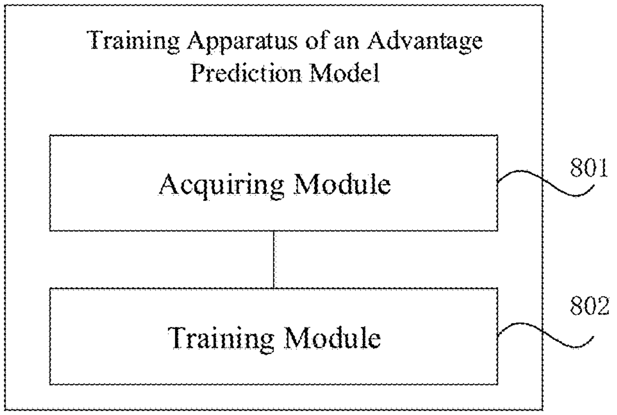

FIG. 8 is a block diagram of a training apparatus of an advantage prediction model illustrated by an exemplary embodiment of the present disclosure. As illustrated in FIG. 8, the apparatus may include:

an acquiring module 801, configured to acquire an advantage value of each confrontation among a plurality of confrontations within a preset historical period and historical confrontation positive performance sample data of both game players before each confrontation;

a training module 802, configured to train a first preset initial model by taking the advantage value of each confrontation among the plurality of confrontations and the historical confrontation positive performance sample data of both game players before each confrontation as first training data, so as to obtain the advantage prediction model.

By using the above-described technical solutions, an advantage prediction model for acquiring a player advantage during the game confrontation process may be trained; and the advantage value output by the advantage prediction model can measure the confrontation experience and the confrontation intense degree from a global dimension.

Optionally, the acquiring module 801 is configured to:

acquire respective game tiers of both game players before each confrontation and game data corresponding to each time bucket during the confrontation process, where the game data includes a score difference of each game scoring dimension;

determine an average tier and a tier difference of the confrontation according to respective game tiers of both game players before each confrontation; and determine an advantage value of each confrontation according to the average tier, the tier difference, and the game data.

Optionally, the acquiring module 801 is configured to:

determine a game win rate of a designated opponent at each time point according to the average tier, the tier difference, and the game data corresponding to each time bucket;

calculate an advantage period of the designated opponent and an advantage level at each time point according to the game win rate of the designated opponent at each time point; and determine the advantage value of each confrontation according to the advantage period and the advantage level of each time point.

Optionally, the acquiring module 801 is configured to:

determine a target win rate prediction model from a target set according to the average tier and a target identifier of each time bucket, where the target set includes a win rate prediction model for each time bucket under different average tiers; and take the average tier, the tier difference, and the score difference of each game scoring dimension as inputs to the target prediction model, so as to acquire the game win rate output by the target prediction model.

Optionally, a training method of a win rate prediction model of each time bucket under different average tiers may include:

acquiring historical game sample data, where the historical game sample data includes a tier difference sample feature of both game players under each time bucket in each confrontation among the plurality of confrontations and a score difference sample feature of each game scoring dimension; and determining the win rate prediction model corresponding to each time bucket under each average tier according to the tier difference sample feature of each time bucket under each average tier in the historical game sample data and the score difference sample feature.

By using the above-described technical solutions, an advantage prediction model for acquiring a player advantage during the confrontation process may be trained; and the advantage value output by the advantage prediction model can measure the confrontation experience and the confrontation intense degree from a global dimension.

Figure 9:
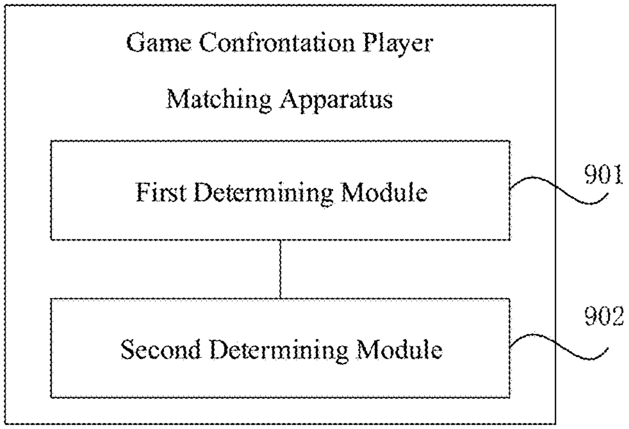

FIG. 9 is a block diagram of a game confrontation player matching apparatus illustrated by another exemplary embodiment of the present disclosure. As illustrated in FIG. 9, the game confrontation player matching apparatus may be applied to a controller. The controller includes the advantage prediction model trained by using the method as described in FIG. 1 or FIG. 2 above. The apparatus includes:

a first determining module 901, configured to, in response to a game opponent matching request from a target player, determine a predicted advantage value of the target player over each player to be matched through the advantage prediction model, where the predicted advantage value is used to represent an advantage that the target player has when the player to be matched plays against the target player; and a second determining module 902, configured to match the target player with an opponent player from the plurality of players to be matched according to the predicted advantage value.

By using the above technical solutions, the advantage during the confrontation process can be measured through the advantage value, so that the confrontation experience and the confrontation intense degree can be measured from a global dimension. The target player is matched with the opponent player according to the advantage value, which may more effectively improve user experience and reduce probability of game user loss.

Optionally, the second determining module 902 is configured to:

determine a target confrontation type corresponding to the target player, where the target confrontation type is used to represent different degrees of game experience needs; and take the player to be matched as the opponent player in the case where it is determined that the predicted advantage value belongs to the target confrontation type.

Optionally, the second determining module 902 is configured to:

determine the advantage value interval corresponding to the target confrontation type; and determine that the predicted advantage value belongs to the target confrontation type in the case where the predicted advantage value belongs to the advantage value interval.

Optionally, the first determining module 901 is configured to:

acquire first confrontation positive performance data of the player to be matched within a designated historical period and second confrontation positive performance data of the target player; and input the first confrontation positive performance data and the second confrontation positive performance data into the preset advantage prediction model, so as to acquire the predicted advantage value output by the advantage prediction model.

Optionally, the second determining module 902 is configured to:

acquire user attribute data of the target player, where the user attribute data includes a user identity feature and a user game attribute feature; and input the user attribute data into the confrontation type prediction model that is preset, so as to acquire the target confrontation type output by the confrontation type prediction model.

Optionally, a training mode of the confrontation type prediction model includes:

acquiring user attribute sample data of a plurality of players, where the user attribute sample data includes confrontation type annotation data; and training a second preset initial model by taking the user attribute sample data as second training data, so as to obtain the confrontation type prediction model.

In the above technical solutions, the advantage during the confrontation process can be measured through the advantage value, so that the confrontation experience and the confrontation intense degree may be measured from a global dimension. The target player is matched with the opponent player according to the advantage value, which may more effectively improve user experience and reduce probability of game user loss.

Hereinafter, referring to FIG. 10, it shows a structural schematic diagram of an electronic device 600 suitable for implementing the embodiments of the present disclosure. The terminal device according to the embodiments of the present disclosure may include but not limited to a mobile terminal such as a mobile phone, a laptop, a digital broadcast receiver, a personal digital assistant (PDA), a tablet computer (PAD), a portable multimedia player (PMP), a vehicle-mounted terminal (e.g., a vehicle-mounted navigation terminal), etc., and a stationary terminal such as a digital TV, a desktop computer, etc. The electronic device illustrated in FIG. 10 is only an example and should not impose any limitation on functionality and scope of use of the embodiments of the present disclosure.

Figure 10:
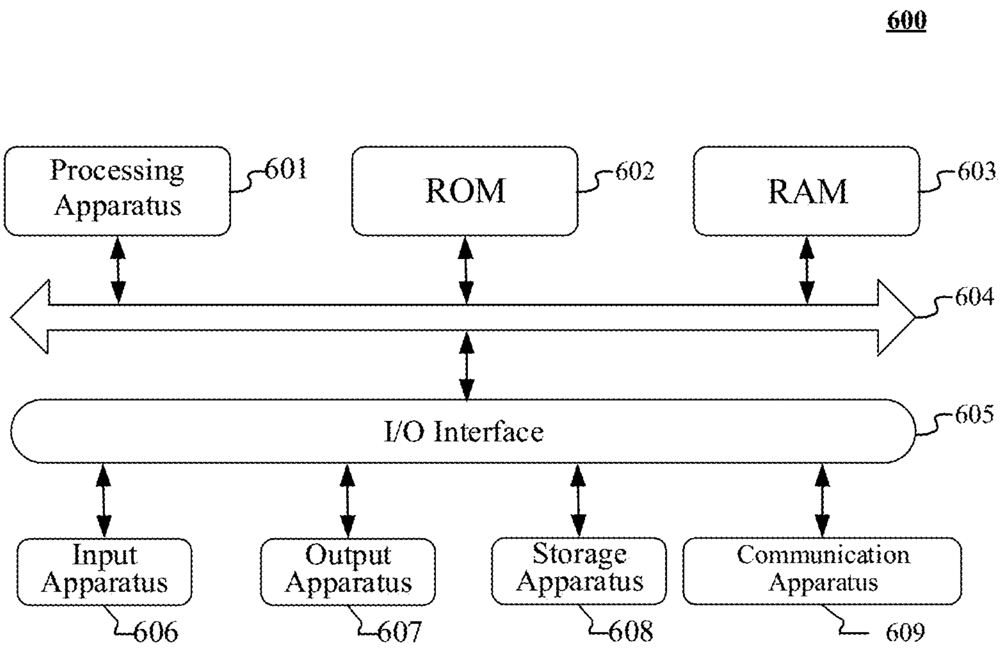

As illustrated in FIG. 10, the electronic device 600 may include a processing apparatus (e.g., a central processing unit, a graphics processing unit, etc.) 601, which may executes various appropriate actions and processing according to a program stored in a read-only memory (ROM) 602 or a program loaded from a storage apparatus 608 into a random access memory (RAM) 603. The RAM 603 further stores various programs and data required for operation of the electronic device 600. The processing apparatus 601, the ROM 602, and the RAM 603 are connected with each other through a bus 604. An input/output (I/O) interface 605 is also coupled to the bus 604.

Usually, apparatuses below may be coupled to the I/O interface 605: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a speaker, a vibrator, etc.; a storage apparatus 608 including, for example, a magnetic tape, a hard disk, etc.; and a communication apparatus 609. The communication apparatus 609 may allow the electronic device 600 to perform wireless or wired communication with other device so as to exchange data. Although FIG. 10 illustrates the electronic device 600 including various apparatuses, it should be understood that, it is not required to implement or have all the apparatuses illustrated, and the electronic device 600 may alternatively implement or have more or fewer apparatuses.

Specifically, according to the embodiments of the present disclosure, the process described above with reference to a flow chart may be implemented as computer software programs. For example, the embodiments of the present disclosure include a computer program product, which includes a computer program carried on a non-volatile computer readable medium, the computer program includes program codes for executing the method illustrated in the flow chart. In such embodiments, the computer program may be downloaded and installed from the network via the communication apparatus 609, or installed from the storage apparatus 608, or installed from the ROM 602. When executed by the processing apparatus 601, the computer program may execute the above-described functions defined in the method according to the embodiments of the present disclosure.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquiring an advantage value of each confrontation among a plurality of confrontations within a preset historical period and historical confrontation positive performance sample data of both game players before each confrontation; and training a first preset initial model by taking the advantage value of each confrontation among the plurality of confrontations and the historical confrontation positive performance sample data of both game players before each confrontation as first training data, so as to obtain the advantage prediction model.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first determining module may also be described as "a module that determines a predicted advantage value of the target player over each player to be matched through the advantage prediction model in response to a game opponent matching request from the target player, and the predicted advantage value being used to represent an advantage that the target player has when the player to be matched plays against the target player".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, example 1 provides a training method of an advantage prediction model, and the method comprises:

acquiring an advantage value of each confrontation among a plurality of confrontations within a preset historical period and historical confrontation positive performance sample data of both game players before each confrontation; and training a first preset initial model by taking the advantage value of each confrontation among the plurality of confrontations and the historical confrontation positive performance sample data of both game players before each confrontation as first training data, so as to obtain the advantage prediction model.

According to one or more embodiments of the present disclosure, example 2 provides the method of example 1, and acquiring the advantage value of each confrontation among the plurality of confrontations within the preset historical period comprises:

acquiring respective game tiers of both game players before each confrontation and game data corresponding to each time bucket during confrontation process, wherein the game data comprises a score difference of each game scoring dimension;

determining an average tier and a tier difference of the confrontation according to respective game tiers of both game players before each confrontation; and determining the advantage value of each confrontation according to the average tier, the tier difference, and the game data.

According to one or more embodiments of the present disclosure, example 3 provides the method of example 2, and determining the advantage value of each confrontation according to the average tier, the tier difference, and the game data comprises:

determining a game win rate of a designated opponent at each time point according to the average tier, the tier difference, and the game data corresponding to each time bucket;

calculating an advantage period of the designated opponent and an advantage level at each time point according to the game win rate of the designated opponent at each time point; and determining the advantage value of each confrontation according to the advantage period and the advantage level of each time point.

According to one or more embodiments of the present disclosure, example 4 provides the method of example 3, and determining the game win rate of the designated opponent at each time point according to the average tier, the tier difference, and the game data corresponding to each time bucket comprises:

determining a target win rate prediction model from a target set according to the average tier and a target identifier of each time bucket, wherein the target set comprises a win rate prediction model for each time bucket under different average tiers; and taking the average tier, the tier difference, and the score difference of each game scoring dimension as inputs of the target prediction model, so as to acquire the game win rate output by the target prediction model.

According to one or more embodiments of the present disclosure, example 5 provides the method of example 4, and a training method of the win rate prediction model for each time bucket under different average tiers comprises:

acquiring historical game sample data, wherein the historical game sample data comprises a tier difference sample feature of both game players under each time bucket in each confrontation among the plurality of confrontations and a score difference sample feature of each game scoring dimension; and determining the win rate prediction model corresponding to each time bucket under each average tier according to the tier difference sample feature of each time bucket under each average tier in the historical game sample data and the score difference sample feature.

According to one or more embodiments of the present disclosure, example 6 provides a game confrontation player matching method, applied to a controller, wherein the controller comprises the advantage prediction model according to any of examples 1-5 above, and the method comprises:

in response to a game opponent matching request from a target player, determining a predicted advantage value of the target player over each player to be matched through the advantage prediction model, wherein the predicted advantage value is used to represent an advantage that the target player has when the player to be matched plays against the target player; and matching the target player with an opponent player from a plurality of players to be matched according to the predicted advantage value.

According to one or more embodiments of the present disclosure, example 7 provides the method of example 6, and matching the target player with the opponent player from the plurality of players to be matched according to the predicted advantage value comprises:

determining a target confrontation type corresponding to the target player, wherein the target confrontation type is used to represent different degrees of game experience needs; and taking the player to be matched as the opponent player in a case where it is determined that the predicted advantage value belongs to the target confrontation type.

According to one or more embodiments of the present disclosure, example 8 provides the method of example 7, and determining that the predicted advantage value belongs to the target confrontation type comprises:

determining an advantage value interval corresponding to the target confrontation type; and determining that the predicted advantage value belongs to the target confrontation type in a case where the predicted advantage value belongs to the advantage value interval.

According to one or more embodiments of the present disclosure, example 9 provides the method of example 6, and determining the predicted advantage value of the target player over each player to be matched comprises:

acquiring first confrontation positive performance data of the player to be matched within a designated historical period and second confrontation positive performance data of the target player; and inputting the first confrontation positive performance data and the second confrontation positive performance data into the advantage prediction model that is preset, so as to acquire the predicted advantage value output by the advantage prediction model.

According to one or more embodiments of the present disclosure, example 10 provides the method of example 7, and determining the target confrontation type corresponding to the target player comprises:

acquiring user attribute data of the target player, wherein the user attribute data comprises a user identity feature and a user game attribute feature; and inputting the user attribute data into a confrontation type prediction model that is preset, so as to acquire the target confrontation type output by the confrontation type prediction model.

According to one or more embodiments of the present disclosure, example 11 provides the method of example 10, and a training mode of the confrontation type prediction model comprises:

acquiring user attribute sample data of a plurality of players, wherein the user attribute sample data comprises confrontation type annotation data; and training a second preset initial model by taking the user attribute sample data as second training data, so as to obtain the confrontation type prediction model.

According to one or more embodiments of the present disclosure, example 12 provides a training apparatus of an advantage prediction model, and the apparatus comprises:

an acquiring module, configured to acquire an advantage value of each confrontation among a plurality of confrontations within a preset historical period and historical confrontation positive performance sample data of both game players before each confrontation; and a training module, configured to train a first preset initial model by taking the advantage value of each confrontation among the plurality of confrontations and the historical confrontation positive performance sample data of both game players before each confrontation as first training data, so as to obtain the advantage prediction model.

According to one or more embodiments of the present disclosure, example 13 provides a game confrontation player matching apparatus, applied to a controller, wherein the controller comprises the advantage prediction model according to any of examples 1-5, and the apparatus comprises:

a first determining module, configured to, in response to a game opponent matching request from a target player, determine a predicted advantage value of the target player over each player to be matched through the advantage prediction model, wherein the predicted advantage value is used to represent an advantage that the target player has when the player to be matched plays against the target player; and a second determining module, configured to match the target player with an opponent player from a plurality of players to be matched according to the predicted advantage value.

According to one or more embodiments of the present disclosure, example 14 provides a computer readable medium, wherein a computer program is stored on the computer readable medium, and the computer program, when executed by a processing apparatus, implements steps of the method according to any of examples 1-5 or 6-11.

According to one or more embodiments of the present disclosure, example 15 provides an electronic device, which comprises:

a storage apparatus, storing a computer program; and a processing apparatus, configured to execute the computer program in the storage apparatus, so as to implement steps of the method according to any of examples 1-5 or 6-11.

The above description is only preferred embodiments of the present disclosure and explanation of the applied technical principles. Those skilled in the art should understand that the scope of disclosure involved in the present disclosure is not only limited to the technical solutions formed by the specific combination of the above-described technical features, but also covers other technical solutions formed by an arbitrary combination of the above-described technical features or equivalent features thereof without departing from the above-described disclosure concept. For example, the above-described features and the technical features disclosed in the present disclosure (but not limited thereto) and having similar functions are replaced with each other to form a technical solution.

Furthermore, although the respective operations are described in a particular order, this should not be understood as requiring the operations to be executed in the particular order illustrated or in a sequential order. Under certain circumstances, multitasking and parallel processing may be favorable. Similarly, although the above discussion includes a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the subject matter has been described in terms specific to the structural features and/or method logic actions, it should be understood that the subject matter defined in the appended claims is not necessarily limited to the specific features or actions as described above. On the contrary, the specific features and actions as described above are only examples of implementing the claims. With respect to the apparatus according to the above-described embodiments, specific modes in which the respective modules execute operations have been described in detail in the embodiments related to the method, and no details will be repeated here.

The invention claimed is:

1. A method of improving online gaming, comprising:

acquiring an advantage value of each confrontation among a plurality of confrontations between two users within a preset historical period and historical confrontation positive performance sample data of both users before each confrontation;

training a first preset initial model using the advantage value of each confrontation among the plurality of confrontations and the historical confrontation positive performance sample data of both users before each confrontation as first training data, so as to obtain a trained advantage prediction model; and during the online gaming, applying the trained advantage prediction model to determine a first user associated with a new confrontation in response to a request from a second user associated with the new confrontation, wherein the trained advantage prediction model is configured to determine an advantage value of the second user over the first user.

2. The method according to claim 1, wherein acquiring the advantage value of each confrontation among the plurality of confrontations within the preset historical period comprises:

acquiring respective game tiers of both users before each confrontation and game data corresponding to each time bucket during confrontation process, wherein the game data comprises a score difference of each game scoring dimension;

determining an average tier and a tier difference of the confrontation according to respective game tiers of both users before each confrontation; and determining the advantage value of each confrontation according to the average tier, the tier difference, and the game data.

3. The method according to claim 2, wherein determining the advantage value of each confrontation according to the average tier, the tier difference, and the game data comprises:

determining a game win rate of a designated opponent at each time point according to the average tier, the tier difference, and the game data corresponding to each time bucket;

calculating an advantage period of the designated opponent and an advantage level at each time point according to the game win rate of the designated opponent at each time point; and determining the advantage value of each confrontation according to the advantage period and the advantage level of each time point.

4. A game confrontation player matching method, applied to a controller, wherein the controller comprises the advantage prediction model according to claim 2, and the method comprises:

in response to the request from the second user, determining a predicted advantage value of the second user over each candidate user to be matched through the trained advantage prediction model, wherein the predicted advantage value is used to represent an advantage that the second user has when the candidate user to be matched plays against the second user; and matching the second user with the first user from a plurality of candidate users to be matched according to the predicted advantage value.

5. The method according to claim 3, wherein determining the game win rate of the designated opponent at each time point according to the average tier, the tier difference, and the game data corresponding to each time bucket comprises:

determining a target win rate prediction model from a target set according to the average tier and a target identifier of each time bucket, wherein the target set comprises a win rate prediction model for each time bucket under different average tiers; and taking the average tier, the tier difference, and the score difference of each game scoring dimension as inputs of a win rate prediction model, so as to acquire the game win rate output by the win rate prediction model.

6. A game confrontation player matching method, applied to a controller, wherein the controller comprises the advantage prediction model according to claim 3, and the method comprises:

in response to the request from the second user, determining a predicted advantage value of the second user over each candidate user to be matched through the trained advantage prediction model, wherein the predicted advantage value is used to represent an advantage that the second user has when the candidate user to be matched plays against the second user; and matching the second user with the first user from a plurality of candidate users to be matched according to the predicted advantage value.

7. The method according to claim 5, wherein a training method of the win rate prediction model for each time bucket under different average tiers comprises:

acquiring historical game sample data, wherein the historical game sample data comprises a tier difference sample feature of both users under each time bucket in each confrontation among the plurality of confrontations and a score difference sample feature of each game scoring dimension; and determining the win rate prediction model corresponding to each time bucket under each average tier according to the tier difference sample feature of each time bucket under each average tier in the historical game sample data and the score difference sample feature.

8. A gamma confrontation player matching method, applied to a controller, wherein the controller comprises the advantage prediction model according to claim 5, and the method omprises:

in response to the request from the second user, determining a predicted advantage value of the second user over each candidate user to be mathed through the trained advantage prediction model, wherein the predicted advantage value is used to represent an advantage that the second user has when the candidate user to be matched plays againt the second user; and matching the second user with the first user from a plurality of candidate users to be matched according to the predicted advantage value.

9. A game confrontation player matching method, applied to a controller, wherein the controller comprises the advantage prediction model according to claim 1, and the method comprises:

in response to the request from the second user, determining a predicted advantage value of the second user over each candidate user to be matched through the trained advantage prediction model, wherein the predicted advantage value is used to represent an advantage that the second user has when the candidate user to be matched plays against the second user; and matching the second user with the first user from a plurality of candidate users to be matched according to the predicted advantage value.

10. The method according to claim 9, wherein matching the second user with the first user from the plurality of candidate users to be matched according to the predicted advantage value comprises:

determining a confrontation type corresponding to the second user, wherein the confrontation type is used to represent different degrees of game experience needs; and taking the first user as the opponent player in a case where it is determined that the predicted advantage value belongs to the confrontation type.

11. The method according to claim 10, wherein determining that the predicted advantage value belongs to the confrontation type comprises:

determining an advantage value interval corresponding to the confrontation type; and determining that the predicted advantage value belongs to the confrontation type in a case where the predicted advantage value belongs to the advantage value interval.

12. The method according to claim 9, wherein determining the predicted advantage value of the second user over each candidate user to be matched comprises:

acquiring first confrontation positive performance data of the first user within a designated historical period and second confrontation positive performance data of the second user; and inputting the first confrontation positive performance data and the second confrontation positive performance data into the advantage prediction model that is preset, so as to acquire the predicted advantage value output by the advantage prediction model.

13. The method according to claim 10, wherein determining the confrontation type corresponding to the second user comprises:

acquiring user attribute data of the second user, wherein the user attribute data comprises a user identity feature and a user game attribute feature; and inputting the user attribute data into a confrontation type prediction model that is preset, so as to acquire the confrontation type output by the confrontation type prediction model.

14. The method according to claim 13, wherein a training mode of the confrontation type prediction model comprises:

acquiring user attribute sample data of a plurality of players, wherein the user attribute sample data comprises confrontation type annotation data; and training a second preset initial model by taking the user attribute sample data as second training data, so as to obtain the confrontation type prediction model.

15. A computer readable medium, wherein a computer program is stored on the computer readable medium, and the computer program, when executed by a processing apparatus, implements steps of the method according to claim 9.

16. An electronic device, comprising:

a storage apparatus, storing a computer program; and a processing apparatus, configured to execute the computer program in the storage apparatus, so as to implement steps of the method according to claim 9.

17. A game confrontation player matching apparatus, applied to a controller, wherein the controller comprises the advantage prediction model according to claim 1, and wherein the controller is configured to:

in response to the request from the second user, determine a predicted advantage value of the second user over each candidate user to be matched through the trained advantage prediction model, wherein the predicted advantage value is used to represent an advantage that the second user has when the candidate user to be matched plays against the second user; and match the second user with the first user from a plurality of candidate users to be matched according to the predicted advantage value.

18. A computer readable medium, wherein a computer program is stored on the computer readable medium, and the computer program, when executed by a processing apparatus, implements steps of the method according to claim 1.

19. An electronic device, comprising:

a storage apparatus, storing a computer program; and a processing apparatus, configured to execute the computer program in the storage apparatus, so as to implement steps of the method according to claim 1.

20. A device comprising:

at least one processor; and at least one memory comprising computer-readable instructions that upon execution by the at least one processor cause the at least one processor to perform operations comprising:

acquiring an advantage value of each confrontation among a plurality of confrontations between two users within a preset historical period and historical confrontation positive performance sample data of both users before each confrontation;

training a first preset initial model using the advantage value of each confrontation among the plurality of confrontations and the historical confrontation positive performance sample data of both users before each confrontation as first training data, so as to obtain a trained advantage prediction model; and during online gaming, applying the trained advantage prediction model to determine a first user associated with a new confrontation in response to a request from a second user associated with the new confrontation, wherein the trained advantage prediction model is configured to determine an advantage value of the second user over the first user.

* * * * *